E. H. SANDERS.
IDENTIFICATION COUPON BOOK.
APPLICATION FILED OCT. 5, 1921.

1,407,443.

Patented Feb. 21, 1922.

INVENTOR
EDWARD H. SANDERS.
BY
Chas. E. Townsend.
ATTORNEY

UNITED STATES PATENT OFFICE.

EDWARD H. SANDERS, OF SAN FRANCISCO, CALIFORNIA, ASSIGNOR TO SHELL COMPANY OF CALIFORNIA, OF SAN FRANCISCO, CALIFORNIA, A CORPORATION OF CALIFORNIA.

IDENTIFICATION COUPON BOOK.

1,407,443.  Specification of Letters Patent.  Patented Feb. 21, 1922.

Application filed October 5, 1921. Serial No. 505,475.

*To all whom it may concern:*

Be it known that I, EDWARD H. SANDERS, a citizen of the United States, residing at the city and county of San Francisco and State of California, have invented new and useful Improvements in Identification Coupon Books, of which the following is a specification.

This invention relates to identification or coupon books intended for use in the purchase of fuel and lubricating oils.

It has been the custom among large distributors to supply oil and gasoline at a reduced rate to what are known as commercial users, which term includes owners of commercial vehicles and others, such as doctors and the like, who make use of automobiles in carrying on their business or profession. In order that they may be identified, it has been the custom in the past to provide such commercial users with a card or badge, but that system was a failure, due to the fact that it provided no check on the attendant in charge of the service station, and he therefore was enabled to cover shortages by reporting the sale of more fuel and oil to commercial users than what actually occurred. Furthermore, the cards or badges were likely to fall into the hands of unauthorized persons and they afforded no means of detecting the error. To solve this difficulty it has been attempted to issue a sort of script book containing coupons redeemable for a certain amount of gas and oil, but this has never been a success for the reason that the users objected to paying for oil and gasoline in advance.

In and by the present invention I have provided a novel book containing coupons specially designed to show the amount of oil or gasoline purchased and adapted to be detached and filed with the records of the attendant as a voucher and authorization for the sale of oil and gasoline at reduced rates. The coupon further serves as an identification of the user, since each coupon at the time of purchase must be signed by the owner and the cover of the book contains his permanent signature for comparison. The cover may also show the license number of the vehicle, and thus serve to identify the particular vehicle. This book is issued free of charge to those entitled to the commercial rate.

Figure 1:
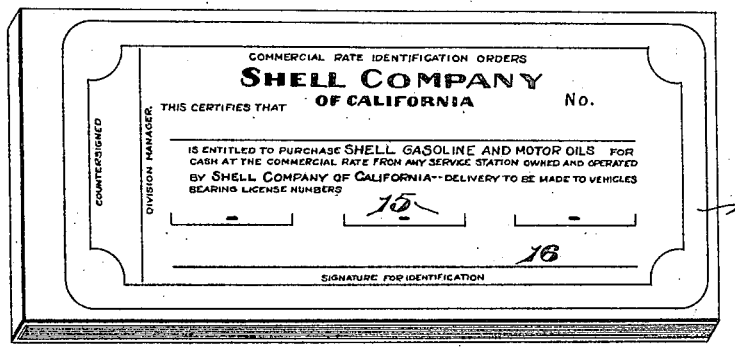
Figure 1 shows a plan view of the front cover of the book.
Figure 2:
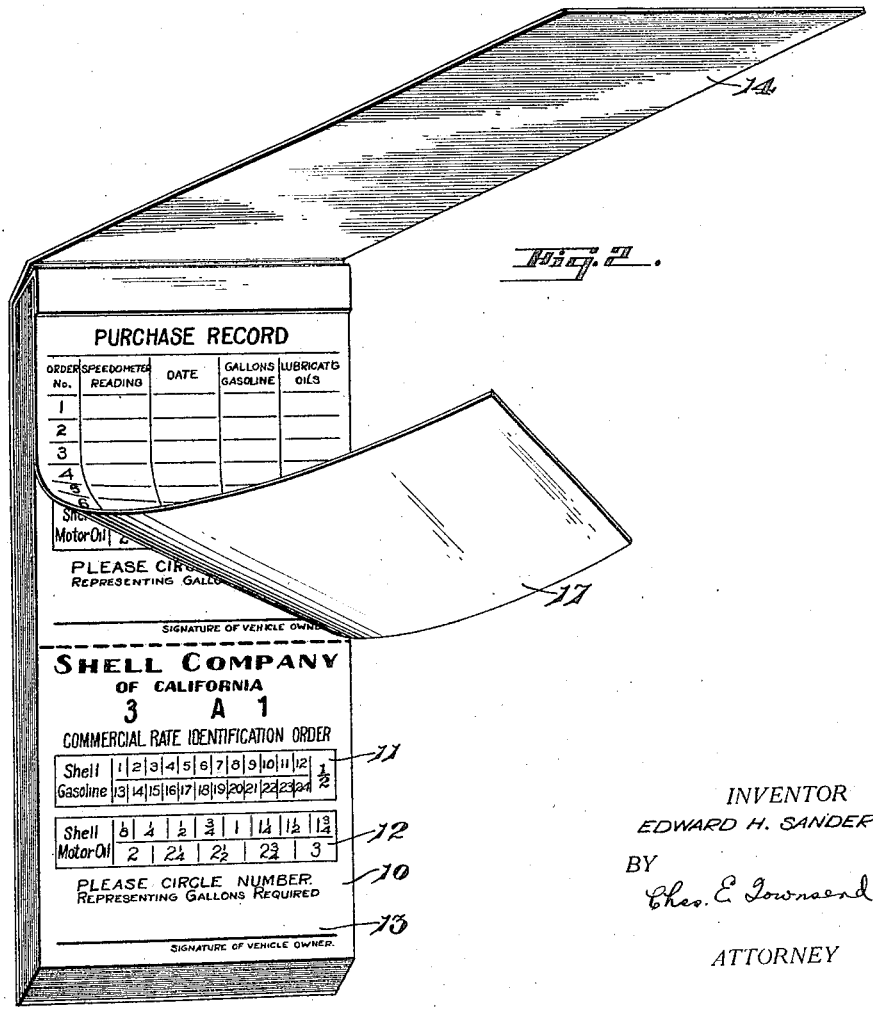
Fig. 2 shows a plan view of the book with the front cover in open position.

The book contains a large number of detachable coupons 10 preferably two to the page. These are numbered serially and each one contains a table 11 for the gasoline, and a table 12 for the lubricating oil. The gasoline table includes numbers from 1 to 24, and likewise a fractional number, representing the number of gallons involved in the particular purchase. The oil table includes whole numbers from 1 to 3 and fractional numbers, such as $\tfrac{1}{8}$, $\tfrac{1}{4}$ and $\tfrac{1}{2}$, to indicate the amount of the purchase in gallons. At the bottom of each coupon is a space 13 for the signature of the owner. At the time of the purchase of the gasoline or oil the owner signs the coupon and the attendant indicates on the tables 11 and 12 the amount and nature of the purchase, either by punching the corresponding number or placing an indicating mark thereon. This coupon is filed away by the attendant and forms a part of his permanent records, and constitutes a voucher for the difference between the regular and commercial rates.

The front cover, page 14 of the book, contains a space 15 for the license number of the vehicle and a space 16 for the signature of the owner. At the time the book is issued the owner is required to sign the front cover of the book, preferably in the presence of a witness, and this signature affords a means of identification of the owner in all subsequent transactions. To further enhance the value of the book it may contain a page 17 for the entry of the various purchases and the mileage resulting therefrom.

The present coupon book is distinguishable from prior coupon books or script books in that it is intended for issuance free of charge to certain class of customers, and the coupons are only of value when properly signed by the one entitled thereto. The coupon has no premium or cash value. Its entire office is to identify the commercial user and serve as a voucher for the records of the distributor.

Having thus described my invention, what I claim and desire to secure by Letters Patent is:

1. An identification and voucher for commercial users of gasoline and oil, comprising a book intended for issuance free of charge to certain classes of customers, and containing a number of detachable coupons, each bearing separate tables of figures, one indicating the measure of fuel purchased, and the other indicating the measure of oil purchased, and having a space thereon for the signature of the purchaser, and a cover for the book, containing the permanent signature of the customer for comparison with the signature on the coupons.

2. An identification and voucher for commercial users of oil and gasoline, comprising a book intended for issuance free of charge to certain classes of customers and containing a number of detachable coupons, each serially numbered and bearing a table of figures indicating in terms of measure the amount of fuel or oil purchased, and having a space thereon for the signature of the purchaser and a cover for the book containing the permanent signature of the customer and the license number of the vehicle for which the fuel or oil is intended.

EDWARD H. SANDERS.